United States Patent [19]

Peiffer et al.

[11] Patent Number: 4,678,339
[45] Date of Patent: Jul. 7, 1987

[54] SCREW EXTRUDER

[75] Inventors: Herbert Peiffer, Mainz; Horst Eberhardt, Walluf, both of Fed. Rep. of Germany

[73] Assignee: Hoechst Aktiengesellschaft, Frankfurt am Main, Fed. Rep. of Germany

[21] Appl. No.: 765,720

[22] Filed: Aug. 15, 1985

[30] Foreign Application Priority Data

Aug. 17, 1984 [DE] Fed. Rep. of Germany ....... 3430254

[51] Int. Cl.$^4$ .............................. B29F 3/01; B29F 3/02
[52] U.S. Cl. ......................................... 366/76; 366/77; 366/79
[58] Field of Search ........................ 366/69, 76, 77, 79, 366/88, 89, 150, 156, 318, 323; 425/208

[56] References Cited

U.S. PATENT DOCUMENTS

| | | | |
|---|---|---|---|
| 4,439,041 | 3/1984 | Schaeffer et al. | 366/79 X |
| 4,462,692 | 7/1984 | Meyer | 366/89 |
| 4,494,877 | 1/1985 | Upmeier et al. | 366/76 |

FOREIGN PATENT DOCUMENTS 3226918 2/1984 Fed. Rep. of Germany .

*Primary Examiner*—Timothy F. Simone

*Attorney, Agent, or Firm*—Schwartz, Jeffery, Schwaab, Mack, Blumenthal & Evans

[57] ABSTRACT

Disclosed is a screw extruder comprising a feed bush having a screw extruder coaxially mounted therein, and which, around its circumference, is provided with several longitudinally extending grooves distributed evenly in the circumferential direction. Adapters are disposed in the grooves which can be adjusted radially in the grooves relative to the extruder screw with the aid of adjustment mechanisms. Each adapter is connected to several bolts connected over the length of the adapter. The bolts pass through holes in the feed bush and are surrounded by helical springs, each of which is supported on the one side against a collar of the bolt and on the other side against a face of the hole. The bolts are of one-piece or two-piece design and may include at the outer bolt ends, rollers which are pressed against cam rings or a cam segment, which surround the extruder barrel in annular or semi-annular shape. The adjustment mechanisms adjust the cam rings or the cam segment and thus, through the bolt, the adapters in the grooves. The adapters may be adjusted in the grooves parallel or inclined to the inner circumferential surface of the feed bush. Also disclosed is a method for controlling extrusion in a screw extruder.

25 Claims, 7 Drawing Figures

SCREW EXTRUDER

BACKGROUND OF THE INVENTION

The present invention relates to a screw extruder with a feed bush axially surrounding an extruder screw. The feed bush is arranged in the area of the material intake and comprises several longitudinally extending grooves distributed around its inner circumference in the circumferential direction. The invention also relates to a method for controlling extrusion in a screw extruder.

A screw extruder of this type is described in German Pat. No. 3,226,918. The extruder is designed so that the feed bush, seated in the extruder barrel and axially surrounding the extruder screw, processes various material grades relative to the extruder screw with various twist-effect. For this purpose, the feed bush is subdivided into a rotatable longitudinal section and a rotationally fixed longitudinal section. The rotatable longitudinal section is mounted downstream, in the feed direction, of the material intake hole, rotatable relative to the extruder barrel and the extruder screw. The rotationally fixed longitudinal section has one zone upstream and one zone downstream of the material intake hole. The rotational movement of the rotatable longitudinal section of the feed bush is determined either by a rotary drive or by a brake. The feed grooves may have a uniform width over their entire length or else a width dimension converging in the feed direction which is preferably designed such that the increase in cross-sectional width is inversely proportional to the decrease in cross-sectional height. In this case, the cross-sectional height of the feed grooves of the rotationally fixed section and the rotatable longitudinal section decreases continuously over the entire length of the feed grooves, i.e., the end of the feed grooves in the rotationally fixed longitudinal section has the same cross-sectional height as the beginning of the feed grooves in the rotatable longitudinal section. The cross-sectional width of the feed grooves in the rotationally fixed longitudinal section is many times greater at its end than the cross-sectional width of the feed grooves in the rotatable longitudinal section at its beginning. The cross-sectional widths of the feed grooves in the rotatable longitudinal section are many times wider at their end than at their beginning. With this design of the feed grooves, the cross-sectional height is fixed over the entire length of the feed grooves so that an adaptation of the processing speed to various grades of the plastics material to be processed can only be achieved by regulating the rotational movement of the rotatable longitudinal section of the feed bush. This involves twist-like displacement movements between the feed grooves of the rotatable longitudinal section of the feed bush and the circumference of the extruder screw. It is understood, therefore, that a blockage of the groove cross-sections between the fixed longitudinal section and the rotatable longitudinal section must be avoided.

European Published Application No. A2-0,069,271 describes a screw extruder with an extruder barrel in which a rotatable extruder screw is mounted. Grooves which have a triangular cross-section and extend spirally are arranged in the inner circumferential surface of the feed zone or of the feed bush of the extruder barrel, in the feed zone upstream and downstream of the filling hole for the plastics raw material. The grooves extend from a maximum groove depth at the beginning of the feed zone to a groove depth equal to zero at the end of the feed zone. The shape, i.e., the longitudinal cross-section of the grooves and their number, is thus fixed and can only be changed by exchanging the extruder barrel.

As is known, in plasticizing extruders, raw plastic material is conveyed and consolidated in the feed zone and melted in the compression or melt zone. In the metering zone, the melt is homogenized and brought to the necessary die pressure. In shaping of the feed zone, two concepts are customary in the latest state of the art, namely, the smooth screw or extruder barrel used in conventional application, and the grooved barrel, used in positive or forced conveying application.

The grooved extruder barrel was used, as a first application, in the processing of hard to convey plastic powder-primarily high-molecular polyethylene-which could not be processed completely in conventional extruders. Nowadays, the advantages of this method mean that forced conveying is used not only for plastic powder but also for many plastic granules. In general, this method is always suitable if the coefficient of friction between the plastic particles is greater by a certain amount than the coefficient of friction between the plastic fill and the metallic walls of the extruder barrel. If this is the case, a much higher throughput is provided than with the conventional method, and it is substantially independent of the counterpressure, i.e., die pressure. However, as is known, force conveyance only functions if the grooves of the feed zone are intensely cooled so that an initial or even complete melting of the plastic particles is avoided.

According to the state of the art, at an inside diameter D of the feed bush, the grooved feed zone has a length of L=2 to 4 D, the grooves extending either axially parallel or helically. However, there have also already been described feed lengths of up to L=5 to 6 D, which make possible greater screw channel depths and thus, in the final analysis, greater throughputs with pressure independency of the output. As a rule, the grooves made in the feed bush are of conical design, i.e., they taper continuously from the deepest dimension at the channel entrance to the end of the feed zone. Grooves with rectangular, triangular, semi-circular or crescent-shaped profiles are often used. The grooves are slotted or milled into the inner circumferential surface of the feed bush and remain constant in their number, width, depth and length during operation.

The grooves permanently made in the extruder barrel necessitate a relatively high starting torque in start-up of the extruder compared with the conventional system having a smooth extruder barrel. In many cases this requires both a greatly over-dimensioned electric motor with gear, as well as robustly designed components, such as a screw and screw barrel. Both not only drive up costs but, due to the necessarily relatively wide screw flights, are also uneconomical because effective channel surface is lost and the conveying efficiency is reduced.

Associated with the high starting torque is the fact that grooved extruder barrels tend to overheat the material in the feed zone during start-up. This results in a material loss since the stationary operating status is not reached until later and the melt is decomposed more intensely by the elevated temperature. Reaching the stationary status can then take 2 to 3 hours in practice.

In addition to the disadvantages in the start-up process, the rigid, grooved system also has severe disadvantages in stationary operation. The throughput of grooved feed bushes is primarily determined by the frictional relationships on the smooth barrel wall and in the grooves or on the grooved shear surfaces, the feed bush and screw geometries and the screw speed. With adequate feed bush length, the throughput is, on the other hand, independent of the pressure profile in the melt and metering zones. Conversely, this also means, however, that the throughput dictated by the feed zone can no longer be changed by the subsequent zones which are overridden by the feed zone.

For the screw geometry of the metering zone, which is fixed as a result of the material throughput to be expected, a pressure $\Delta p$ of the order of magnitude of $$\Delta p \approx \frac{12 \eta L}{h^3} \cdot \left( \frac{\pi n D h \cos\phi}{2} - \frac{\dot{m}}{\rho B} \right)$$

is approximately produced. The individual quantities are each specified in the following example. If, for example, the pressure is $\Delta p \approx 0$ bar-as is described in the European Published Application No. A2-0,069,271 and which reflects minimum shear degradation-through-put variations may occur during operation due to altered frictional relationships, for example, due to altered particle structure of the product, processing of several materials in the extruder, different speeds or temperatures or altered bulk density $\rho s$ in the feed zone. These variations then result in a pressure build-up in the metering zone or, less desirably, a pressure reduction, as is illustrated by the following example:

EXAMPLE

| | |
|---|---|
| Viscosity | $\eta$ = 300 Pa.s, channel length L = 6.6 m |
| Channel height | h = 8 mm, speed N = 49 rpm |
| Diameter | D = 200 mm, helix angle |
| $\phi$ = 17.6°, throughput $\dot{m}$ of feed zone = 900 kg/h, | |
| Melt density | $\rho$ = 750 kg/m³, channel width B = 170 mm. |

Calculation using these data gives a pressure drop in the metering zone of $\Delta p \approx -1.6$ bar, which is very close to the above-mentioned optimum $\Delta p \approx 0$.

If, with the above-mentioned conditions, the throughput then changes to, for example, $\tilde{\tilde{m}} = 1100$ kg/h, the pressure in the metering zone drops by about 204 bar, which has a detrimental effect on product quality due to greater shearing and, in addition, necessitates a higher drive power.

If the friction values for the extruder design are not available or can only be roughly measured—with the present stage of the art friction values can only be measured up to temperatures of about 160° C. at pressures of up to 100 bar although higher temperatures and pressures prevail in the feed zone, depending on the material—this may result in an inadequate matching between the zones. As a consequence there are excessive pressures at the entrance to the metering zone or already in the melt zone if it is, for example, designed as a barrier screw. If the latter is designed too short for the throughput to be processed, this results in material squeezing ahead of the barrier flight, with pressures in excess of 1000 bar being initiated. Relatively great pressure fluctuations at the screw tip may also occur if the shape and number of the grooves are not matched to the particle geometry. The dynamic behavior of the extruder also demonstrates great differences, for example, in the transition from spherical to lenticular granules.

SUMMARY OF THE INVENTION

It is therefore an object of the present invention to provide a plasticizing screw extruder having an improved, forced-conveying, grooved feed bush.

Another object of the present invention is to provide a plasticizing screw extruder as described above which prevents overheating of the plastic material during start-up of the extruder.

Yet another object of the invention is to provide an extruder as described above which prevents material loss in stationary operation of the extruder.

Additionally, a further object of the invention is to provide a screw extruder in which the feed bush evincing improved adjustment can be adjusted quickly and without great effort to changing material properties in such a way that the desired operating conditions in the extruder are retained.

Thus, in accomplishing the foregoing objects, there has been provided in accordance with one aspect of the present invention, a screw extruder, comprising an extruder screw, a feed bush, coaxially surrounding the extruder screw and positioned about a material intake, a plurality of longitudinally extending grooves circumferentially positioned about the inner circumference of the bush, an adapter positioned in each of the plurality of grooves, and adjustment means for radially adjusting the adapters relative to the extruder screw over the depth of the grooves. In a preferred embodiment, the feed bush comprises from about 4 to 10 grooves.

In accordance with another aspect of the present invention, there is provided a method of controlling extrusion in a screw extruder, comprising the steps of providing a screw extruder as described above, extruding a material, and adjusting the adapters in the grooves to control the flow of the material.

The screw extruder according to the present invention advantageously provides for varying the number of grooves in operation, their depth and their conical design in the longitudinal direction. This means that, in operation, the throughput can be set such that optimum or desired relationships along the screw axis are produced, on the one hand, and that a certain groove geometry can be selected which minimizes the pressure pulsations at the screw tip, on the other hand. When starting up the extruder, the adjustment mechanisms can be used to completely close the grooves, causing the screw barrel to have a smooth inner circumferential surface with a very small external friction value. Once the screw extruder has been increased to operating speed, the adapters in the grooves can be adjusted continuously to the desired final position to obtain the desired groove geometry. The melt pressure is at the same time measured at at least two various points of the metering zone and the adjustment of the adapters in the grooves is made according to the measured values.

Further objects, features and advantages of the present invention will become apparent from the detailed description of preferred embodiments which follows, when considered in light of the figures of drawing.

DETAILED DESCRIPTION OF THE PREFERRED EMBODIMENTS

The present invention provides a screw extruder which comprises grooves having adapters therein which are radially adjustable relative to the extruder screw over the depth of the grooves by means of adjustment mechanisms.

Figure 1:
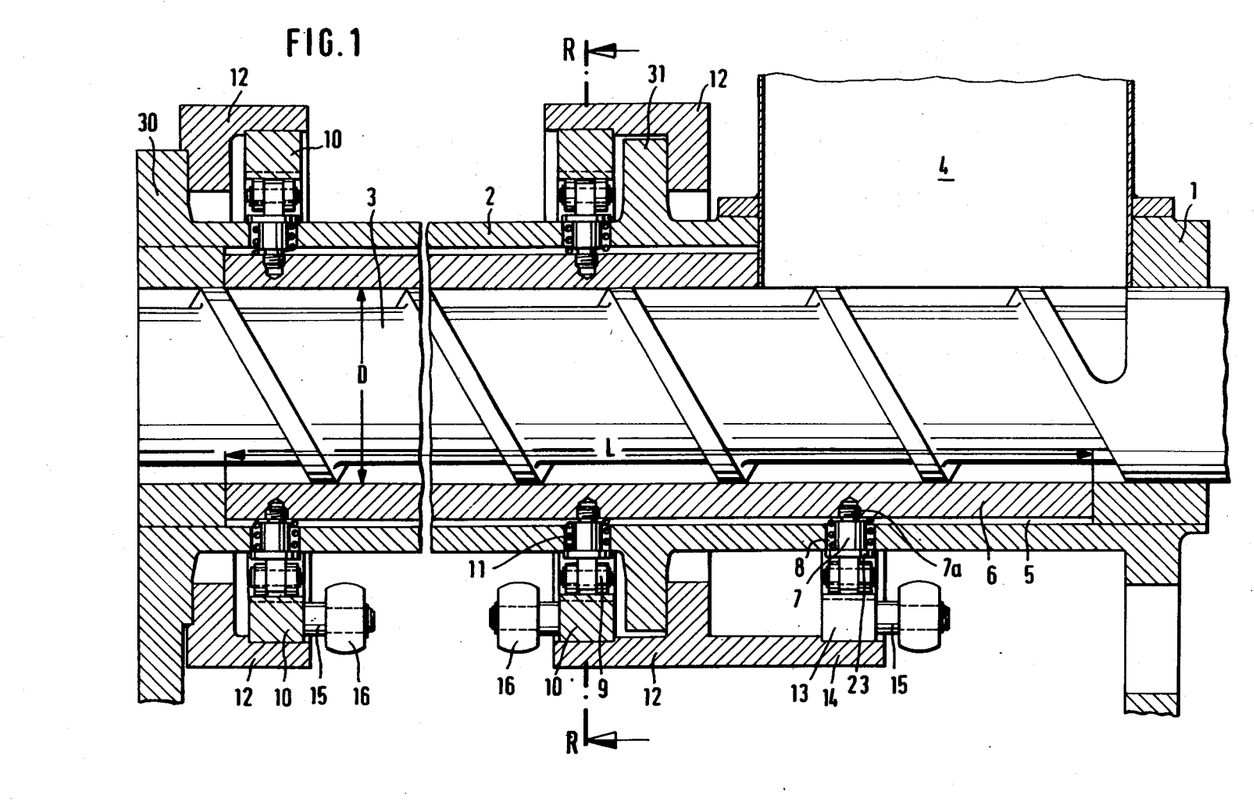
FIG. 1 presents a longitudinal sectional view through the feed bush of a screw extruder according to one embodiment of the present invention.

FIG. 1 shows the feed zone of a screw extruder. The feed zone comprises a barrel 1 with a feed bush 2, a rotating extruder screw 3 mounted in the barrel and a filling hopper 4. Milled out in the feed bush 2 are axially parallel grooves 5 in which there are adapters 6 which are adjustable in radial direction relative to the extruder screw 3 over the depth of the grooves 5 by means of an adjustment mechanism 16, 17, 18 (see FIG. 2). By radially displacing the adapters in the direction away from the mid-axis of the screw extruder, the axially parallel longitudinal grooves 5' are cleared in the grooves 5 of the feed bush 2. In the drawing, eight grooves 5 are shown, but the extruder is not restricted to this number. From about four to ten grooves may be evenly distributed around the inner circumferential surface of the feed bush 2. The length of a forced conveying groove 5 is advantageously equal to about three to five inside diameters D of the feed bush 2, not including the dimension of the filling hopper 4. In the region of the filling hopper 4, the grooves 5 are present only on the side opposite the hopper filling hole. Although not shown, the grooves may also be of a helical design. However, a design of this type necessitates adapters which are difficult to make from a production engineering point of view.

The adjustment mechanism is used to adjust the depth of the longitudinal grooves 5' to the necessary operating condition. Viewed along their length, the adapters are retained by adjustment bolts, hereinafter referred to simply as bolts 7. These bolts 7 are provided with offset threaded pins 7a which are bolted to the adapters 6. These bolts extend through holes 8 in the feed bush 2 and are supported via rollers 9 on cam rings 10 or a cam segment 13. The rollers 9 are borne in the bolt ends lying outside the feed bush 2. The contact pressure on the cam rings 10 is exerted via helical springs 11, which surround the bolts 7 coaxially in the holes 8 and are supported at one end against a face 24 and at the other end against a collar 23 (FIG. 3) of the bolt 7. The number of cam rings 10 depends on the length of the grooves 5 or the adapters 6. The two front cam rings 10 are housed in split casings 12 which are detachably bolted to a flange 30 of the barrel 1. In the area of the filling hopper 4 there is only the semi-annular cam segment 13, which is similarly housed in a semi-annular casing 14. The semi-annular casing 14 is detachably connected, for example bolted, to a flange 31 of the casing and forms a unit with the casing 12 which lies obliquely opposite the filling hopper 4.

Attached to the cam rings 10 and the cam segment 13 are bolts 15 which are connected to lifting spindle gears 18 via heads 16 and threaded spindles 17. Each head 16 forms an adjustment mechanism with the associated threaded spindle 17 and the lifting spindle gear 18. The lifting spindle gears 18 have a common shaft 19 which is driven by a motor (not shown) and ensures a synchronous adjustment of the cam rings 10 and of the cam segment 13. In the embodiment according to FIG. 1, the adapters 6 are initially arranged in the grooves 5 to terminate flush with the inner circumferential surface of the feed bush 2.

Figure 2:
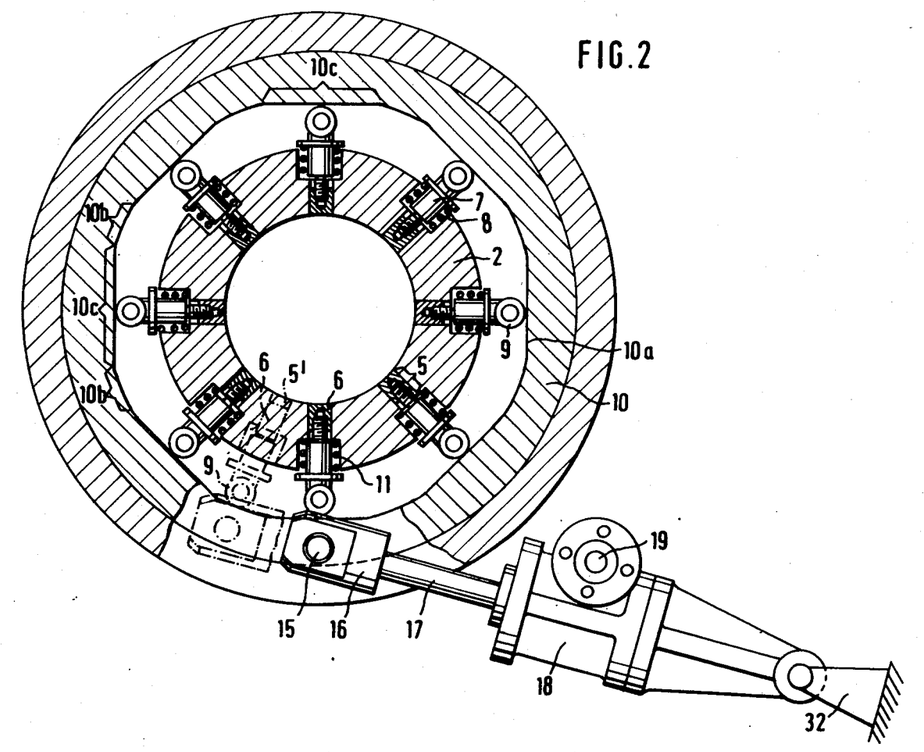
FIG. 2 presents a cross-sectional view through the feed bush along the line R—R in FIG. 1 and an adjustment mechanism which engages in a cam ring on the outside of the screw extruder.

FIG. 2 shows a side view along the line R—R of the feed bush 2 in FIG. 1. Around the circumference of the feed bush 2 are provided eight grooves 5 in which adapters 6 are evenly distributed and terminate flush with the inner circumferential surface of the feed bush 2. The cam ring 10 has a running surface 10a for the rollers 9. The running surface comprises equally long peripheral segments 10b of a circle of given radius arranged concentric to the longitudinal axis of the feed bush 2. These peripheral pieces 10b are connected to one another by cam segments 10c which are convex in the direction of the longitudinal axis of the feed bush 2. This geometry of the running surface 10a ensures that, when positioned in the cam ring such that the rollers 9 are pressed against the middle of the peripheral segments 10c by the helical springs 11, the adapters 6 terminate flush with the inner circumferential surface of the feed bush 2. The adjustment mechanism 16, 17, 18 for the cam ring 10 here assumes the position indicated by solid lines, with its lifting spindle gear 18 being supported in a bearing 32. Adjustment of the cam ring 10 by the adjustment mechanism involves extending the threaded spindle 17 by a certain amount. This brings each of the rollers 9 into pressure contact with the middle of the associated peripheral segments 10b. This latter position of an individual roller 9 and the extended threaded spindle 17 is shown in broken lines. It is noted that, for purposes of illustration, the broken-line positions have been drawn alongside the positions of the rollers and of the adjustment mechanism indicated by solid lines, when, in reality, they replace the solidly drawn positions of the rollers and the adjustment mechanism. The adapter 6 inside a groove 5 is pressed outward via the bolts 7 by means of the helical springs 11 against the middle of the peripheral segments 10b. Since the peripheral segments are the furthest removed from the center axis of the feed bush 2, the adapter is reset in the groove 5 to such an extent that the longitudinal groove 5' assumes its maximum depth. It goes without saying that the threaded spindle 17 of the adjustment mechanism can also be extended to a somewhat lesser extent so that the cam ring 10 assumes a position in which the rollers 9 are in positions in which the adapters 6 assume an intermediate position in the grooves 5. As a result, the longitudinal grooves 5' have a medium depth between the minimum and the maximum depth.

Figure 3:
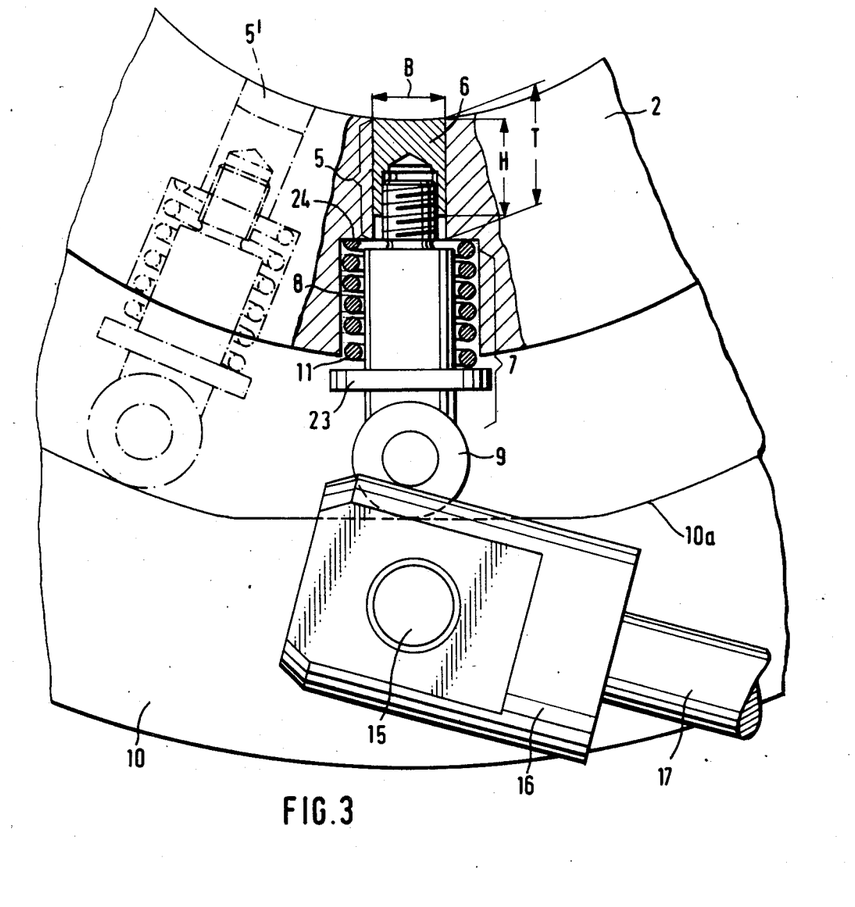
FIG. 3 presents a side view of details of the adjustment mechanism, both of adjustment bolts and two grooves set to various depths.

FIG. 3 shows, in enlarged scale, a section from FIG. 2 from which the positions of the cam ring 10 and the rollers 9 can be clearly seen. The figure illustrates, on the one hand, the radially outward offset of the adapter 6 and, on the other hand, the opposite radially inward offset of the adapter 6 in which the adapter 6 terminates flush with the inner circumferential surface of the feed bush 2. The maximum depth of the running groove 5' is defined as the difference between the depth T of the groove 5 and the height H of the adapter 6. The adapter has the shape of an elongate right parallelpipe of width B and a length equal to the length of the groove 5.

As previously indicated, the bolt 7 is provided with a collar 23, against which one end of the helical spring 11 rests. The other end of the spring rests against the face 24. The helical spring 11 thus adjusts the bolt within the groove radially outwardly until the roller 9 is pressed against the running surface 10a of the cam ring 10.

An adjustment process is described below. The extruder is started with a smooth feed bush 2 to keep the drive movement of the adjustment motor low. After reaching a certain operating condition, pressure sensors in the metering zone and at the screw tip are used to achieve an optimization by variation of the groove geometry in the feed zone. For setting the optimum groove depth of the longitudinal grooves 5', the lifting spindle gears 18 are actuated by the adjustment motor. The cam rings 10 and the cam segment 13 are turned via the threaded spindles 17 which are hingedly mounted on the cam rings 10 via the heads 16. Depending on the extent of the rotation, the depth of the longitudinal grooves 5' can be increased or reduced. Turning the cam ring 10 and the cam segment 13 causes the adapter 6 to be radially displaced in the grooves 5 via the bolts 7 which are supported on the cam rings 10 and the cam segment 13 via the rollers 9. This results in variation of the groove depths. By using this adjustment mechanism, the groove depths can be set according to the particular plastics raw material and the desired throughput to achieve an optimum operating condition.

Figure 4:
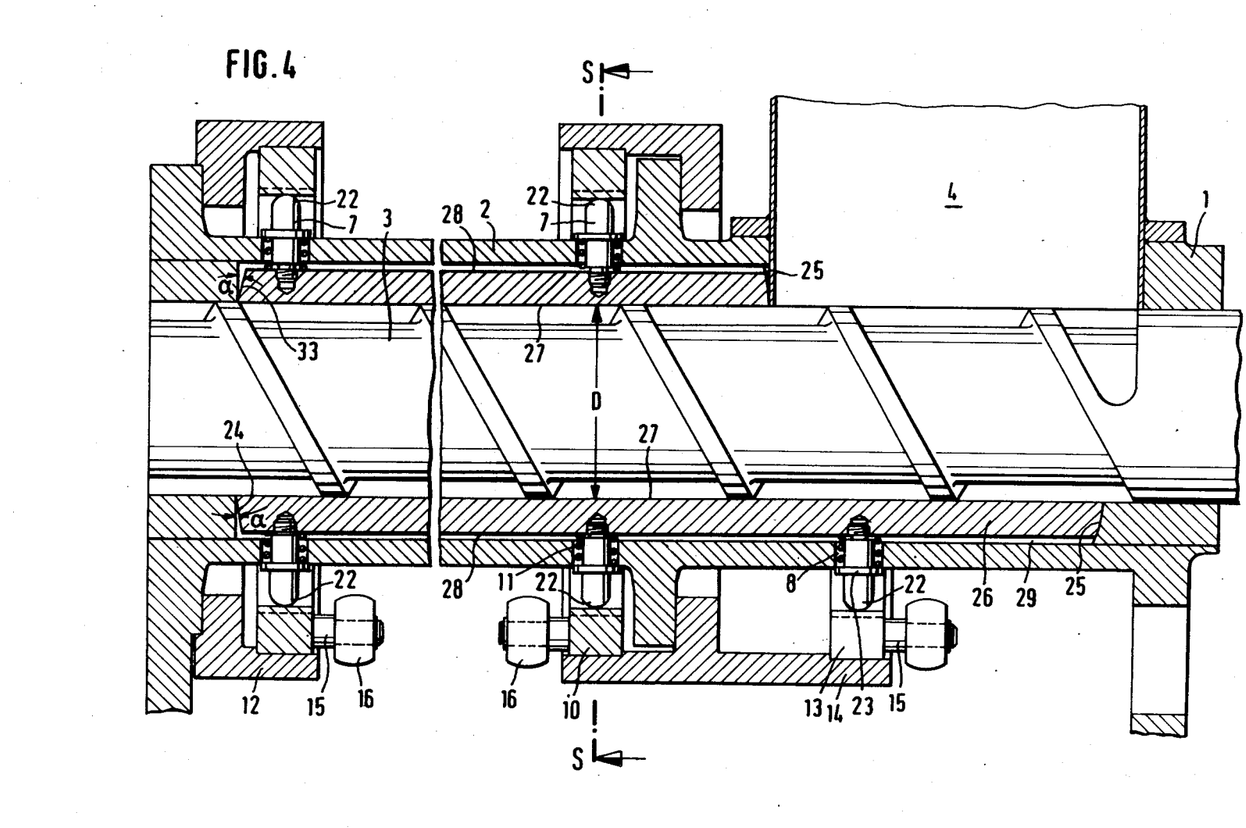
FIGS. 4 and 5 present longitudinal sectional views through another embodiment of the feed bush of the screw extruder with different groove profiles.
Figure 5:
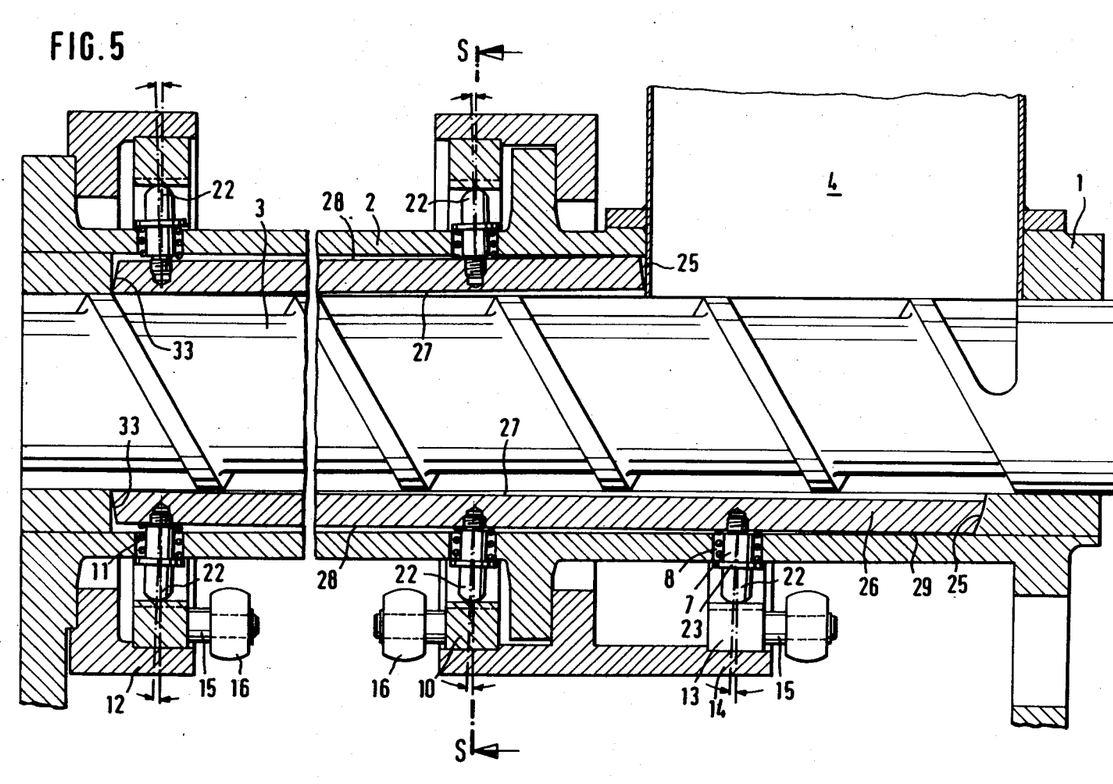

FIGS. 4 and 5 each illustrate a longitudinal section, similar to that in FIG. 1, of a further embodiment of the feed bush 2 of the screw extruder. Compared with the embodiment according to FIG. 1, the designs of the adjustment bolts and the adapters to which the bolts are connected are modified. Each adapter 26 of this embodiment has a longitudinal section which deviates from the rectangular form. The two longitudinal sides 27, 28 of the adapter extend parallel to each other and are of different lengths. The one narrow side 33 of the adapter 26 is a straight line and obliquely joins the two longitudinal sides. The other narrow side 25 of the adapter 26 has a circular curvature with a radius equal to the length of the greater longitudinal side 27.

Just as the adapter 26 differs from the adapter 6, there are also differences in the longitudinal section of the groove 29 of this embodiment in comparison with the groove 5 of the embodiment according to FIG. 1. The longitudinal section of each groove 29 coincides precisely with the greater longitudinal side 27 and the curved narrow side 25 of each adapter 26. The straight-line narrow side of each groove 29 extends perpendicular to the longitudinal sides 27 and 28 of the adapter 26 and subtends an acute angle $\alpha$ with the obliquely extending narrow side 33 of the adapter 26 in such a way that the point of the angle $\alpha$ is on the inner circumferential surface of the feed bush 2.

The bolts 7 of this embodiment of the feed bush 2 differ from the bolts 7 of the embodiment according to FIG. 1 in that the rollers are replaced by convex-machined pieces 22 which are in contact with the cam rings 10.

Figure 7:
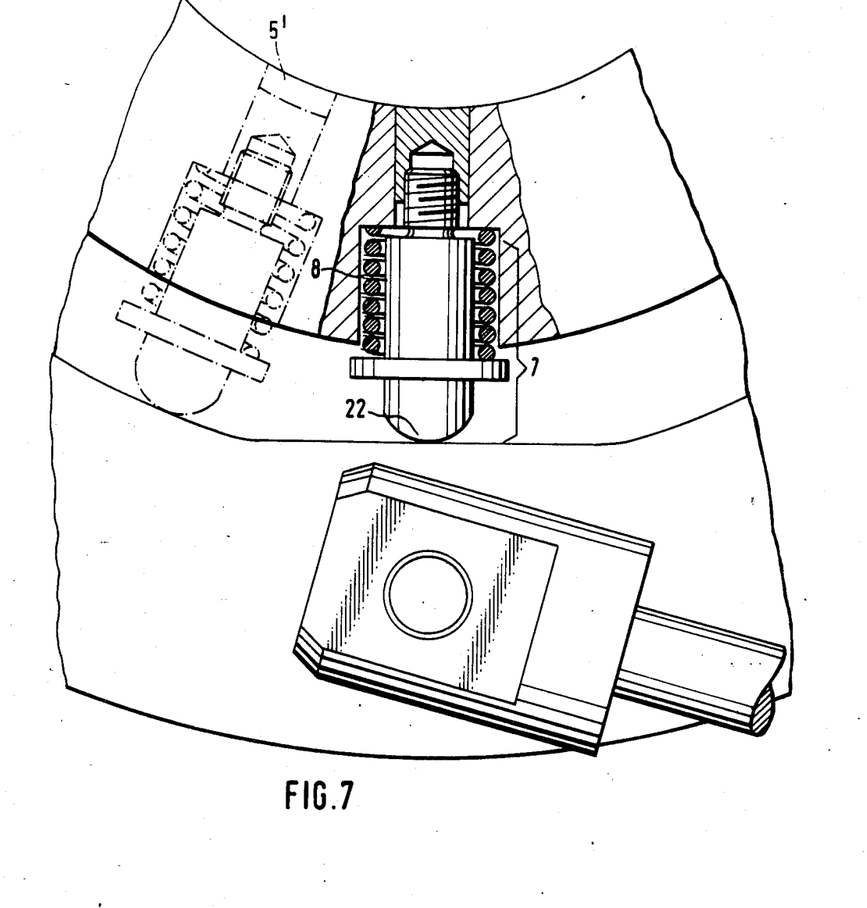
FIG. 7 presents details of the adjustment mechanism with different adjustment bolts than the ones illustated in FIGS. 3 and 6.

In FIG. 7, which reproduces a sectional view along the lines S—S of FIGS. 4 and 5, one of the bolts 7 is shown in an enlarged manner with the calotte-shaped, convex-machined piece 22 of the bolt end directed radially outward. Since it only has a point of contact with the running surface of the cam ring 10, and not a line of contact like the roller 8 in the first embodiment of the bolt, the calotte-shaped convex-machined piece 22 makes possible a slight inclined position of the bolt 7 within the hole 8 with respect to the section or drawing plane. The result is that the bolts are inclined in the grooves 29 according to the inclined position of the individual adapters 26, as can be seen from FIG. 5. This illustrates that the depths of the longitudinal grooves are set at differing depths in the axial direction of the feed bush 2, which means that the longitudinal sides 27 of the individual adapters 26 in the grooves 29 extend inclined to the longitudinal axis of the feed bush 2. This inclined position of the adapters 26 is obtained by the different adjustment of the cam rings 10, arranged in axial succession around the circumference of the feed bush 2, and of the cam segment 13 by means of the associated adjustment mechanisms 16 to 18 and by the special designs of the adapters 26 and of the grooves 29 which make possible an inclined position of the former in such a way that the line of impact between the inclined narrow side 33 and the greater longitudinal side 27 of the adapters acts as a swivelling or rotating axis.

Figure 6:
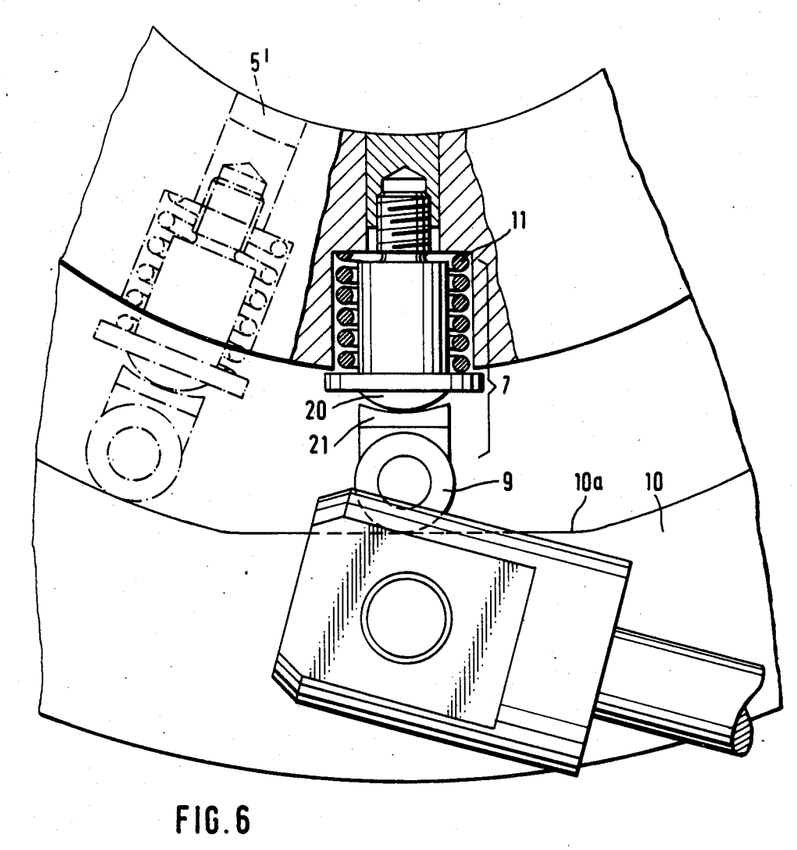
FIG. 6 presents details of the adjustment mechanism in a manner as in FIG. 3, with modified adjustment bolts compared with FIG. 3.

FIG. 6 shows a slightly modified development of the bolts 7 in comparison to those according to FIGS. 3 and 7. Compared with the development according to FIG. 3, the bolts 7 are interrupted and consist of two pieces, of which the first piece has a calotte-shaped convex-machined piece 20 which is supported on a cup-shaped concave-machined piece 21 of the other part. The convex-machined piece 20 and the concave-machined piece 21 have different radii, so that there is only point contact between them. As in the development according to FIG. 3, mounted in the bolt part with the cup-shaped, concave-machined piece 21 is a roller 9 which is pressed by the helical spring 11 against the running surface 10a of the cam ring 10 or of the cam segment 13. The upper part of the bolt, which is supported by its calotte-shaped, convex-machined piece 20 on the cup-shaped concave-machined piece 21 of the lower part of the bolt, is connected to the adapter and can adapt to the inclined position of the adapter within the groove. Although not shown, it is obvious that the two-part bolt 7 can be used instead of the one-part bolt 7 in the embodiment of the feed bush 2 according to FIGS. 4 and 5.

What is claimed is:
1. A screw extruder, comprising:
   a barrel;
   means defining a material intake in said barrel;
   an extruder screw positioned in said barrel;
   a feed bush, coaxially surrounding said extruder screw, having an inner circumference and a side opposite said material intake, and being positioned about the material intake;
   means defining a plurality of longitudinally extending grooves circumferentially positioned about the inner circumference of said bush and having a predetermined depth;
   an adapter positioned in each of said plurality of grooves; and adjustment means for radially adjusting said adapters relative to said extruder screw over the depth of said grooves.

2. A screw extruder as defined in claim 1, wherein said plurality of grooves comprises from about 4 to 10 grooves.

3. A screw extruder as defined in claim 1, wherein, in the area of said material intake, said grooves are provided only on the side of said feed bush opposite said material intake.

4. A screw extruder as defined in claim 1, wherein each of said adapters has a radial height relative to said extruder screw less than the depth of said grooves.

5. A screw extruder as defined in claim 1, further comprising a plurality of bolts positioned along the length of each of said adapters for retaining said adapters, each of said bolts including an offset threaded pin, said threaded pins being bolted with each adapter.

6. A screw extruder as defined in claim 5, wherein said feed bush comprises a plurality of countersunk holes for receiving said bolts, said counter-sunk holes having a diameter which is greater than the width of said grooves, and wherein axes of said holes align with the longitudinal axes of the associated groove of said grooves.

7. A screw extruder as defined in claim 6, further comprising a helical spring surrounding said bolt and being supported at one end against a face of said cylindrical hole adjoining said groove and at an other end against the collar of said bolt.

8. A screw extruder as defined in claim 7, further comprising a cam ring or a cam segment.

9. A screw extruder as defined in claim 8, wherein said bolt presses against said one of a plurality of cam rings or cam segment.

10. A screw extruder as defined in claim 8, wherein said bolt includes at one end a roller positioned radially outside said feed bush and supported on said cam ring or cam segment.

11. A screw extruder as defined in claim 8, further comprising a split casing detachably connected to the barrel of said screw extruder and receiving said cam rings.

12. A screw extruder as defined in claim 8, further comprising a split casing detachably connected to the barrel of said screw extruder and receiving said cam segments.

13. A screw extruder as defined in claim 12, wherein said cam segment comprises a semi-annular design.

14. A screw extruder as defined in claim 8, wherein said adjustment means comprises a plurality of heads, a plurality of threaded spindles and a plurality of lifting spindle gears.

15. A screw extruder as defined in claim 14, wherein said bolts are connected to said adjustment means.

16. A screw extruder as defined in claim 15, wherein said bolts are fixedly connected to said cam rings or said cam segment.

17. A screw extruder as defined in claim 14, wherein said lifting spindle gears are positioned on a common shaft.

18. A screw extruder as defined in claim 17, further comprising a motor for driving said spindle gears and synchronously adjusting said cam rings or said cam segment.

19. A screw extruder as defined in claim 8, wherein said spindles are hingedly mounted on said bolts by said heads.

20. A screw extruder as claimed in claim 5, wherein each adapter comprises a rectangular longitudinal section with longitudinal sides which are equal to an axial length of said groove and narrow sides which are equal to the height of said adapter.

21. A screw extruder as claimed in claim 5, wherein each adapter comprises a longitudinal section which includes two narrow sides and two longitudinal sides which extend parallel to each other and which are of different length, wherein one of said narrow side comprises a straight line which obliquely joins said two longitudinal sides and the other narrow side comprises a circular curvature having a radius equal to the length of the longer longitudinal side.

22. A screw extruder as claimed in claim 10, wherein a longitudinal section with two longitudinal sides of each of said grooves coincides with a longer longitudinal side and a curved narrow side of each of said adapters, and wherein a straight-line narrow side of each of said grooves extends perpendicular to the longitudinal sides of each of said adapters and subtends an acute angle with an obliquely extending narrow side of said adapter.

23. A screw extruder as claimed in claim 7, wherein said bolts comprises a first part comprising a calotte-shaped, convex-machined piece, and a second part comprising a cup-shaped, concave-machined piece for supporting said first part, and wherein said convex-machined piece and said concave-machined piece have different radii.

24. A screw extruder as claimed in claim 9, wherein said bolt ends comprise calotte-shaped convex-machined pieces which are supported on said cam rings or said cam segment.

25. A method of controlling extrusion in a screw extruder, comprising the steps of:
  providing a screw extruder comprising:
    a barrel;
    means defining a material intake in said barrel;
    an extruder screw positioned in said barrel;
    a feed bush, coaxially surrounding said extruder screw, having an inner circumference and a side opposite said material intake, and being positioned about the material intake;
    means defining a plurality of longitudinally extending grooves circumferentially positioned about the inner circumference of said bush and having a predetermined depth;
    an adapter positioned in each of said plurality of grooves; and
    adjustment means for radially adjusting said adapters relative to said extruder screw over the depth of said grooves;
  extruding a material; and
  adjusting said adapter in said grooves to control the flow of said material.

* * * * *